(12) United States Patent
Bettinger et al.

(10) Patent No.: US 9,985,320 B2
(45) Date of Patent: May 29, 2018

(54) WATER-ACTIVATED, INGESTIBLE BATTERY

(71) Applicant: CARNEGIE MELLON UNIVERSITY, Pittsburgh, PA (US)

(72) Inventors: Christopher J. Bettinger, Pittsburgh, PA (US); Jay Whitacre, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 108 days.

(21) Appl. No.: 14/397,527

(22) PCT Filed: Apr. 30, 2013

(86) PCT No.: PCT/US2013/038782
§ 371 (c)(1),
(2) Date: Oct. 28, 2014

(87) PCT Pub. No.: WO2013/165961
PCT Pub. Date: Nov. 7, 2013

(65) Prior Publication Data
US 2015/0118526 A1    Apr. 30, 2015

Related U.S. Application Data

(60) Provisional application No. 61/687,708, filed on Apr. 30, 2012.

(51) Int. Cl.
*H01M 6/30* (2006.01)
*H01M 10/38* (2006.01)
(Continued)

(52) U.S. Cl.
CPC ............ *H01M 10/38* (2013.01); *H01M 4/50* (2013.01); *H01M 4/583* (2013.01); *H01M 6/36* (2013.01);
(Continued)

(58) Field of Classification Search
CPC .......... H01M 10/38; H01M 6/30; H01M 6/32; H01M 6/34
See application file for complete search history.

(56) References Cited

U.S. PATENT DOCUMENTS

| | | | | |
|---|---|---|---|---|
| 4,098,961 A | * | 7/1978 | Sabatino | H01M 4/22 205/63 |
| 6,154,677 A | * | 11/2000 | Leysieffer | H04R 25/554 607/61 |

(Continued)

FOREIGN PATENT DOCUMENTS

| | | |
|---|---|---|
| WO | WO1192936 | 8/2011 |
| WO | WO13165961 | 11/2013 |

OTHER PUBLICATIONS

Delmas (Delmas et al., "A Nasicon-Type Phase as Intercalarion Electrode : Sodium Titanium Phosphate [NaTi2(PO4)3]", Material Resources Bulletin, p. 631-639 [1987, no month]).*

(Continued)

*Primary Examiner* — Jeremiah R Smith
(74) *Attorney, Agent, or Firm* — Fish & Richardson P.C.

(57) ABSTRACT

In one aspect, a water-activated, ingestible battery, comprises a cathode comprising a metal oxide with a decreased amount of toxicity, relative to an amount of toxicity of other metal oxides; an anode comprising a biocompatible, water stable compound, the anode infused with benign cations; a separator between the cathode and the anode; a cathodic lead comprising a first conducting material, the cathodic lead in contact with the cathode; an anodic lead comprising a second conducting material, the anodic lead in contact with the anode; and a cell casing comprising a water-permeable biocompatible polymer, the cathodic lead, and the anodic lead, with the cell casing enclosing the cathode, the anode, and the separator.

24 Claims, 4 Drawing Sheets

(51) Int. Cl.
    *H01M 6/36*     (2006.01)
    *H01M 4/50*     (2010.01)
    *H01M 4/583*     (2010.01)
    *H01M 6/34*     (2006.01)
    *H01M 6/32*     (2006.01)
    *H01M 4/02*     (2006.01)

(52) U.S. Cl.
    CPC ............... *H01M 6/30* (2013.01); *H01M 6/32* (2013.01); *H01M 6/34* (2013.01); *H01M 2004/027* (2013.01); *H01M 2004/028* (2013.01)

(56) References Cited

U.S. PATENT DOCUMENTS

| | | | |
|---|---|---|---|
| 7,978,064 B2 | 7/2011 | Zdeblick et al. | |
| 8,847,766 B2 | 9/2014 | Zdeblick et al. | |
| 2004/0213849 A1* | 10/2004 | Sowden | A23G 1/54 424/472 |
| 2006/0228628 A1* | 10/2006 | Bowden | C01G 45/02 429/224 |
| 2009/0253025 A1* | 10/2009 | Whitacre | H01G 11/06 429/50 |
| 2010/0086833 A1* | 4/2010 | Pozin | H01M 6/16 429/50 |
| 2010/0087885 A1 | 4/2010 | Atanasoska et al. | |
| 2010/0239616 A1* | 9/2010 | Hafezi | A61B 5/073 424/400 |
| 2010/0298668 A1 | 11/2010 | Hafezi et al. | |
| 2011/0269007 A1* | 11/2011 | Visco | H01M 4/06 429/119 |
| 2011/0311853 A1 | 12/2011 | Fratti et al. | |

OTHER PUBLICATIONS

International Search Report and Written Opinion dated Sep. 24, 2014 for Int'l. Appln. No. PCT/US2013/038782 (13 pgs.).

\* cited by examiner

WATER-ACTIVATED, INGESTIBLE BATTERY

CLAIM OF PRIORITY

This application claims the benefit of priority under 35 U.S.C. § 119(e) to provisional U.S. patent application No. 61/687,708, filed on Apr. 30, 2012, the entire contents of which are hereby incorporated by reference.

FIELD OF USE

The present disclosure relates generally to batteries, and specifically to water-activated, ingestible batteries.

BACKGROUND

Medical devices that can be delivered by oral administration may be advantageous over other types of integration methods such as implantation. Orally ingestible devices may offer high degrees of patient compliance, exhibit minimal risk of infection, and obviate many complications associated with chronically implanted devices.

Typically, orally ingestible devices perform some type of biosensing function, which could be critical to gathering important vital information about a patient. For example, cameras may be used to image tissue within the gastrointestinal (GI) tract of the patient in order to identify potentially cancerous regions. Biosensors may be used to measure core temperature, potential hydrogen (pH), or dissolved oxygen concentration, which may provide real time insight into digestive function. Subsequent interrogation of the sensors is typically performed through wireless communication. These devices may include microelectronic components that are typically powered using high performance on-board battery systems that are fabricated from potentially toxic materials. The batteries are hermetically sealed in robust corrosion-resistant packaging materials that reduce the likelihood of leakage.

Innovations in battery materials aim to continuously improve a variety of figures of merit related to battery performance. These innovations include novel material compositions for the anode, cathode, separator, electrolytes, functional electrolyte species, and external packaging of the battery. The material compositions are generally designed to improve operating characteristics of the battery such as energy, density, and power. Many of these innovations in materials and device design are driven by economic considerations with specific applications in mind. For example, some battery innovations would be better suited for large scale energy storage in power plants while others might be better suited for mobile applications such as energy storage in vehicles or personal electronic devices. The primary factors for large energy storage device design tend to be defined by economic considerations.

Cost constraints may be less prohibitive for the design of batteries for medical devices. Batteries designed for chronic implants may include high performance materials that may be potentially highly toxic. Potential toxicity risks may be mitigated by utilizing robust packaging to hermetically seal the battery. This prevents the potential escape of toxic materials into the surrounding tissue. The general design guidelines that are commonly applied to high performance batteries aim to achieve long operation lifetimes (often over 10 years) and facile options for battery maintenance including minimally invasive battery replacement or wireless power transmission for recharging. Batteries that adopt this paradigm are often relatively large, bulky devices that may be suitable for chronic implants such as pacemakers, but may not be suitable for oral ingestion.

SUMMARY

The present disclosure describes apparatus and methods relating to a water-activated, ingestible battery. The battery exhibits a form factor that is identical to a common pill and is composed of non-toxic materials that can be absorbed, metabolized, or excreted by an organism, e.g., a human or other animal, that ingests the battery. Orally ingestible batteries have a broad range of potential applications. Examples of such applications can include powering edible gastric stimulators, edible biosensors, controlled release devices, and optoelectronic devices for optical sensing, gastric illumination, or photothermal ablation of tumors.

In one aspect of the present disclosure, a water-activated, ingestible battery comprises: a cathode comprising a metal oxide with a decreased amount of toxicity, relative to an amount of toxicity of other metal oxides; an anode comprising a biocompatible, water stable compound, the anode infused with benign cations; a separator between the cathode and the anode; a cathodic lead comprising a first conducting material, the cathodic lead in contact with the cathode; an anodic lead comprising a second conducting material, the anodic lead in contact with the anode; and a cell casing comprising a water-permeable biocompatible polymer, the cathodic lead, and the anodic lead, with the cell casing enclosing the cathode, the anode, and the separator.

Implementations of the disclosure can include one or more of the following features. The cathode may include a manganese oxide ($MnO_2$). The anode may include one or more of a porous activated carbon electrode and an intercalated sodium titanium phosphate material. The biocompatible cations may include at least one of sodium or potassium. The separator may include a fibrous cellulosic material. One or more of the first conducting material and the second conducting material may include at least one of a gold material, a graphite material, a carbon material, or a conducting polymer. The water-permeable biocompatible polymer may include at least one of a polyester, an alpha-hydroxy polyester, a poly(L-lactide), a poly(glycolide), a poly(L-lactide) copolymer, a poly(glycolide) copolymer, a poly(ε-caprolactone) (PCL), a polycarbonate, a polyorthoester, a polyanhydride, a polyphosphoester, or a polyamide. In some implementations, the water-activated, ingestible battery may include an electrolyte that permeates through the cell casing and diffuses into the cathode and into the anode to activate the water-activated, ingestible battery. In some implementations, the cell casing may include one or more reservoirs, and the water-activated, ingestible battery may include an electrolyte, with the electrolyte for insertion into the one or more reservoirs within the cell casing, where the electrolyte dissolves and diffuses from the one or more reservoirs into the cathode and the anode, when hydrated in a natural aqueous environment to activate the water-activated, ingestible battery. The electrolyte may include sodium sulfate. The cathode, the anode, the separator, the cathodic lead, and the anodic lead may be arranged in a planar configuration. The water-activated, ingestible battery may include an outer casing comprising gelatin in a capsule form, the outer casing enclosing the cathode, the anode, the separator, the cathodic lead, the anodic lead, and the cell casing. The metal oxide may include a non-toxic metal oxide.

In another aspect of the present disclosure, a method performed by an orally ingestible battery, comprising: following a dissolution of an outer gelatin casing of the orally ingestible battery, diffusing an electrolyte into an anode and a cathode of the orally ingestible battery; activating, based on diffusion of the electrolyte, the orally ingestible battery; following activation, delivering a current across electrode leads of the orally ingestible battery; and ceasing to deliver a current across the electrode leads after a predetermined time; wherein the orally ingestible battery is configured to breakdown following a cease in delivery of the current; and wherein the cathode comprises a metal oxide with a decreased amount of toxicity, relative to the amount of toxicity of other metal oxides to promote safe oral ingestion of the orally ingestible battery by an organism.

Implementations of the disclosure can include one or more of the following features. The method may include causing, based on activation of the orally ingestible battery, a powering of a medical device that is implanted in the organism that ingests the orally ingestible battery. The anode and the cathode may be enclosed in a cell casing that comprises a water-permeable biocompatible polymer. The water-permeable biocompatible polymer may include at least one of a polyester, an alpha-hydroxy polyester, a poly(L-lactide), a poly(glycolide), a poly(L-lactide) copolymer, a poly(glycolide) copolymer, a poly(ε-caprolactone) (PCL), a polycarbonate, a polyorthoester, a polyanhydride, a polyphosphoester, or a polyamide. The anode may include one or more of a porous activated carbon electrode or an intercalated sodium titanium phosphate material. The cathode may include a manganese oxide ($MnO_2$). The electrode leads each may include at least one of a gold material, a graphite material, a carbon material, or a conducting polymer. The method may include dissolving the electrolyte contained in one or more reservoirs within the cell casing before activating the orally ingestible battery. The method may include passing the electrolyte through the cell casing before activating the orally ingestible battery. The electrolyte may include sodium sulfate. Delivering the current across the electrode leads may include migrating sodium cations infused in the anode from the anode to the cathode.

In yet another aspect of the present disclosure, A water-activated, ingestible battery, comprising: a cathode comprising a lambda manganese oxide; an anode comprising a porous activated carbon electrode, the anode infused with sodium cations; a separator between the anode and the cathode, the separator comprising a fibrous cellulosic material; a cathodic lead comprising a gold material, the cathodic lead in contact with the cathode; an anodic lead comprising a gold material, the anodic lead in contact with the anode; a cell casing comprising an alpha-hydroxy polyester, the cathodic lead, the anodic lead, and the cell casing enclosing the cathode, the anode, and the separator; an electrolyte comprising sodium sulfate, the electrolyte to permeate through the cell casing and diffuse into the cathode and the anode to activate the water-activated, ingestible battery; and an outer casing comprising gelatin in a capsule form, the outer casing enclosing the cathode, the anode, the separator, the cathodic lead, the anodic lead, and the cell casing.

The details of one or more implementations are set forth in the accompanying drawings and the description below. Other features, objects, and advantages will be apparent from the description, the drawings, and the claims.

DETAILED DESCRIPTION

A water-activated, ingestible battery consistent with this disclosure may include primarily biocompatible or non-toxic materials that are processed into a form factor, e.g., a cylindrical form factor with a width of 3 mm and a height of 10 mm, that can be swallowed by an organism such as a human or other animal. The form factor may be an enlarged form factor when used for veterinary applications in large animals such as cows or horses. The potential toxicity of the battery is negligible. Due to cost-effective materials and concurrent advances in clean-tech manufacturing, the cost of producing such a battery is low compared to the cost of producing a traditional implantable battery.

Orally ingestible batteries have a broad range of potential applications. Examples of such applications can include powering edible gastric stimulators, edible biosensors, controlled release devices, and optoelectronic devices for optical sensing, gastric illumination, or photothermal ablation of tumors. The battery can be used to power medical devices that can also be swallowed. The battery may be directly integrated with the medical devices, or may be used to power the medical devices remotely or by tethered connection. Examples of medical devices that can be powered by the battery include biosensors and sources of light, heat, or electric current. The battery can be used to trigger the controlled release of therapeutics, including small molecules and macromolecular biomolecules such as proteins, polysaccharides, DNA, and RNA, into the organism. A water-activated, ingestible battery may be used to avoid chronic implantation risks associated with traditional implantable batteries, such as infection, chronic fibrosis, internal tissue or organ damage, and leakage of battery contents.

The battery may or may not be active or operational prior to ingestion by the organism. In the situation where the battery is inactive prior to ingestion, the battery becomes active after ingestion and integration into the gastrointestinal (GI) tract of the organism. The battery may be designed to activate at a predetermined time through the controlled presentation of an aqueous electrolyte. For example, the battery can be activated from the natural moisture of hydrated tissues in the GI tract of the organism or from an external source of water such as a bolus of water consumed by the organism. The battery can be integrated within the GI tract for a finite amount of time after which the materials of the battery can be either absorbed by the organism and eventually metabolized or excreted. In this context, active refers to the act of being functional as in the case of having an electronic load applied to the positive and negative leads of the battery. Inactive refers to not discharging the energy stored in the battery.

Figure 1:
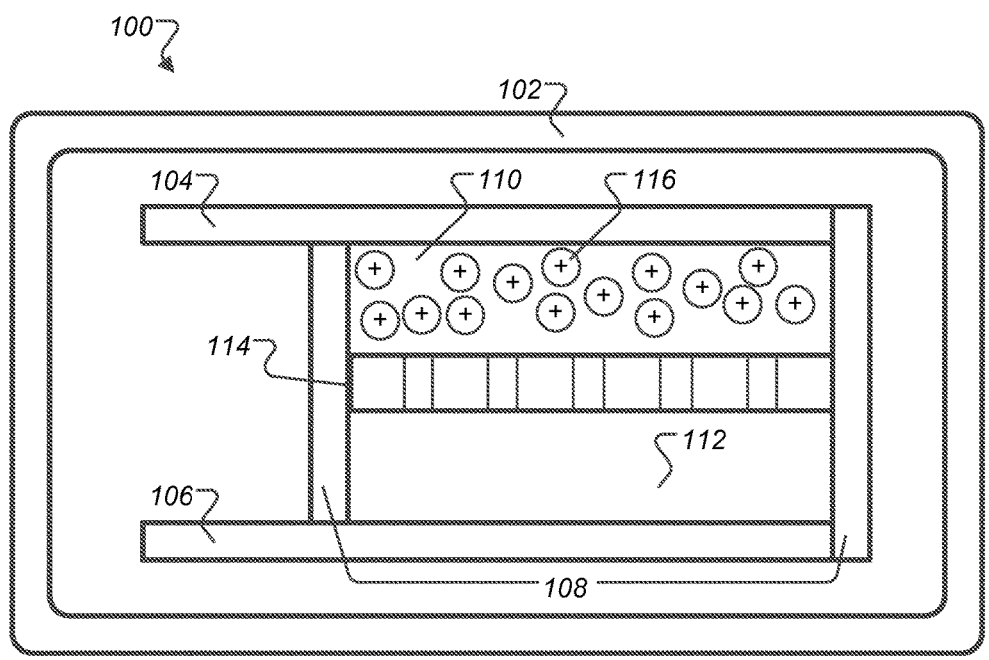
FIG. 1 shows an example of a water-activated, ingestible battery.

FIG. 1 shows an example of a water-activated, ingestible battery 100. The battery 100 may exhibit a form factor similar to that of a common pill. The battery 100 includes non-toxic materials that can be absorbed, metabolized, or excreted by an organism, e.g., a human or other animal, that ingests the battery 100. The battery 100 may include an outer casing 102, a cathodic lead 104, an anodic lead 106, a water-permeable biocompatible polymer 108, an anode 110, a cathode 112, a separator 114, and cations 116. The cathodic lead 104, the anodic lead 106, the anode 110, the cathode 112, and the separator 114 may be arranged in a planar configuration to optimize power output.

The outer casing 102 of the battery 100 may include, for example, gelatin in a capsule form similar to those commonly used in existing oral pill formulations. The outer casing 102 encloses the battery components, such as the cathodic lead 104, the anodic lead 106, the water-permeable biocompatible polymer 108, the anode 110, the cathode 112, the separator 114, and the cations 116. The outer casing 102 may protect the battery components as the battery 100 passes through a stomach and into a small intestine of an organism to ensure that the battery 100 is not subjected to caustic environments. The material of the outer casing 102 can be engineered to dissolve within a precisely defined time line. After dissolution, the outer casing 102 can be absorbed and metabolized by the organism, or excreted by the organism with other non-absorbed battery components.

The cathode 112 may include a metal oxide with a decreased amount of toxicity, relative to an amount of toxicity of other metal oxides. For example, the cathode 112 may include a non-toxic metal oxide such as manganese oxide ($MnO_2$). In such an implementation, a phase of the manganese oxide may be a lambda $MnO_2$. Other morphologies of manganese oxide may be included in the cathode 112, such as alpha $MnO_2$ and electrolytic manganese dioxide.

The anode 110 may include a biocompatible, water stable compound. For example, the anode 110 may include a porous activated carbon electrode, an intercalated sodium titanium phosphate material, or both. An anode 110 that includes an intercalated sodium titanium phosphate material may offer increased performance with the addition of small amounts of benign metals such as titanium.

The anode 110 is infused with functional, benign cations 116. The cations 116 may include, for example, sodium, potassium, other benign cationic species that are naturally occurring in an organism, or a combination. The cations 116 may be loaded via chemical or electrochemical means into the anode 110. The cations 116 serve as counter-ions during operation of the battery 100.

The separator 114 between the anode 110 and the cathode 112 may include a fibrous cellulosic material. The cellulosic material may be pressed into a thin film. The separator 114 serves as a physical barrier between the anode 110 and the cathode 112.

The battery 100 includes leads, e.g., the cathodic lead 104 and the anodic lead 106, that conduct electrons from the reaction areas in the electrodes to an external circuit. The cathodic lead 104 is in contact with the cathode 112. The anodic lead 106 is in contact with the anode 110. The cathodic lead 104 may include a thin film of conducting material, such as a gold material, a graphite material, a carbon material, a conducting polymer, or a combination. Similarly, the anodic lead 106 may include a thin film of conducting material, such as a gold material, a graphite material, a carbon material, a conducting polymer, or a combination.

The water-permeable biocompatible polymer 108, along with the cathodic lead 104 and the anodic lead 106, form a cell casing that encloses the anode 110, the cathode 112, and the separator 114. The polymer 108 may include a polyester, an alpha-hydroxy polyester, a poly(L-lactide), a poly(glycolide), a poly(L-lactide) copolymer, a poly(glycolide) copolymer, a poly(ε-caprolactone) (PCL), a polycarbonate, a polyorthoester, a polyanhydride, a polyphosphoester, a polyamide, or a combination.

Figure 2:
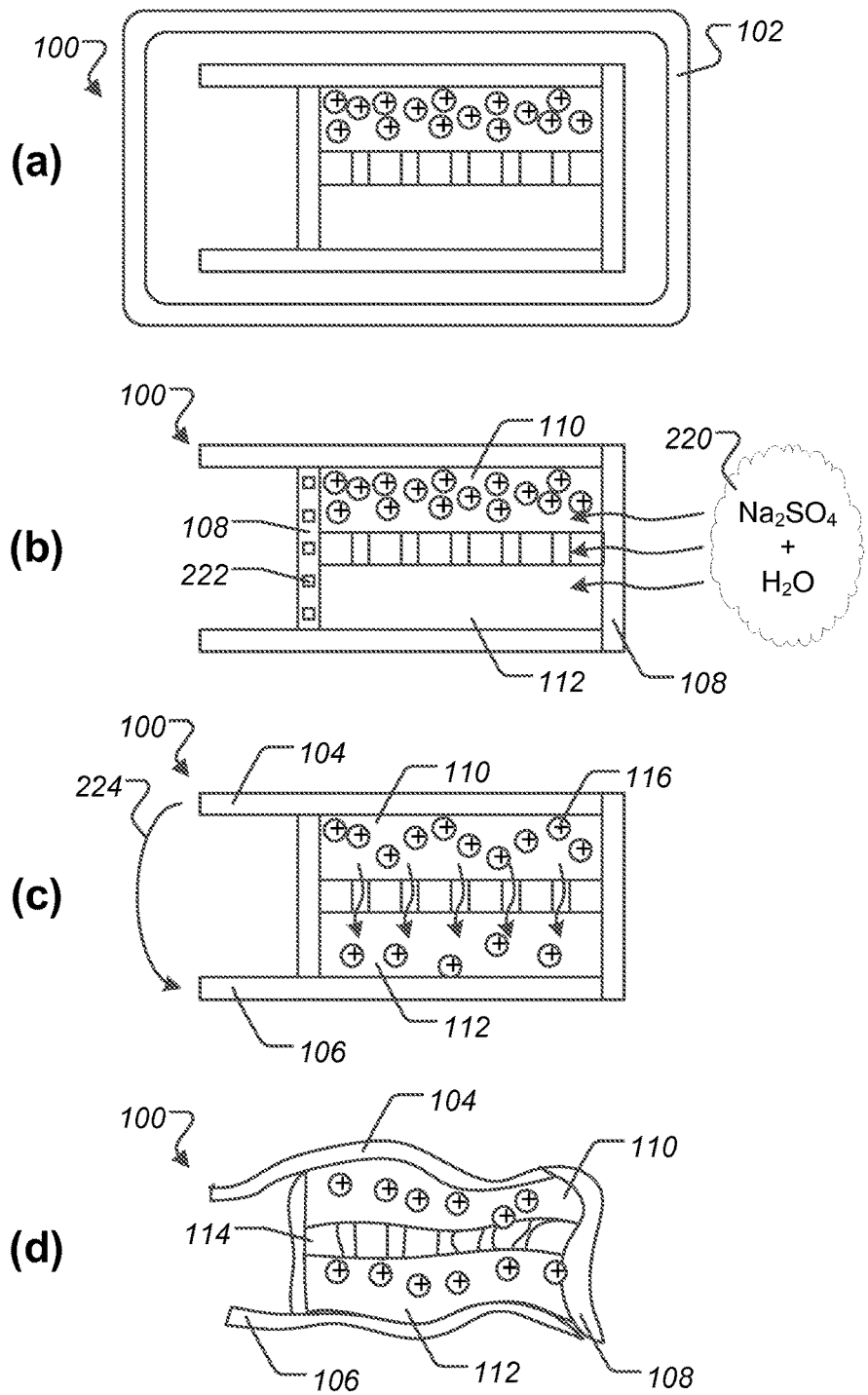
FIG. 2 shows a water-activated, ingestible battery during different stages of operation.
Figure 3:
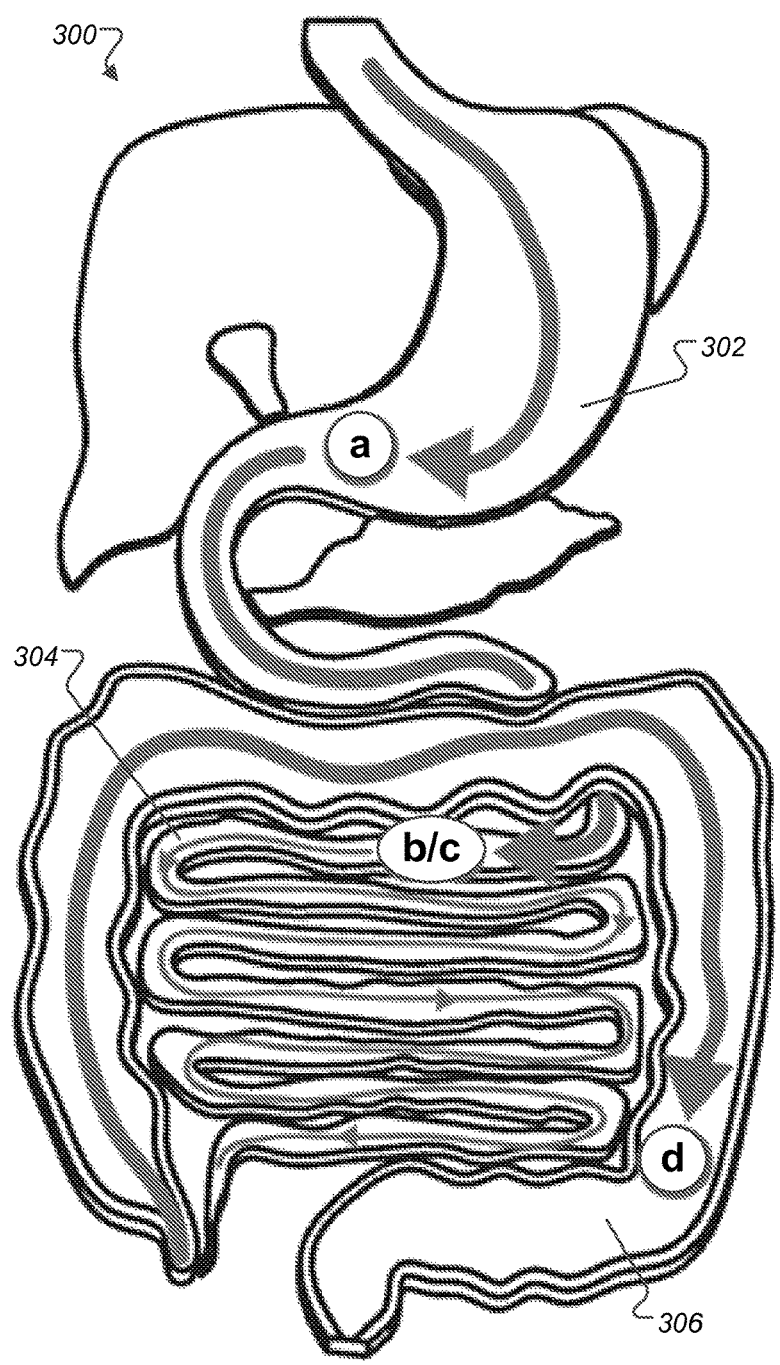
FIG. 3 shows a progression of a water-activated, ingestible battery through a gastrointestinal tract of an organism.

FIG. 2 shows a water-activated, ingestible battery, e.g., the battery 100 of FIG. 1, during different stages (a)-(d) of operation. FIG. 2 will be described in conjunction with FIG. 3, which shows a progression of the battery 100 through a gastrointestinal (GI) tract 300 of an organism during the different stages (a)-(d) of operation. The battery 100 can be selectively activated anywhere within the GI tract 300 through careful selection of materials and design of a geometry of the battery 100.

In stage (a), the components of the battery 100 are enclosed in and protected by the outer casing 102, and the battery 100 is inactive. The battery 100 may be in stage (a) while the battery 100 is passing through a stomach 302 and into a small intestine 304 of the organism. The outer casing 102 can be engineered to dissolve within a precisely defined time line.

The battery 100 progresses to stage (b) after the battery 100 passes through the stomach 302 and into the small intestine 304 of the organism. The outer casing 102 may have completely dissolved after passing through the stomach 302. After dissolution of the outer casing 102, the components of the battery 100 are exposed to an aqueous environment within the small intestine 304 of the organism. The aqueous environment may include an electrolyte 220 that diffuses into the anode 110 and the cathode 112 of the battery 100. The electrolyte 220 may include sodium sulfate ($Na_2SO_4$).

In some implementations, the electrolyte 220 is supplied through exogenous dosing such as consuming an aqueous solution of the electrolyte 220 by the organism. For example, the electrolyte 220 may be supplied by swallowing a 0.5 molarity (M) aqueous solution of sodium sulfate in coordination with ingestion of the battery 100. The bolus of electrolyte 220 in the external environment will lead to diffusion of the electrolyte 220 across the polymer 108 of the outer casing and into the anode 110 and the cathode 112 to initiate battery operation.

In some implementations, the electrolyte 220 may be loaded or embedded into reservoirs 222 within the polymer 108 of the outer casing. The electrolyte 220 may be solid electrolyte that dissolves when the battery 100 is hydrated by an external environment. Hydrating the battery 100 in a natural aqueous environment within the organism will lead to diffusion of the electrolyte 220 and transportation of the ions from the reservoirs 222 into the anode 110 and the cathode 112 to initiate battery operation. The battery 100 can be activated by controlling the rate of hydration from the external environment.

In some implementations, the battery 100, without the outer casing 102, can be immersed in water, the electrolyte 220, or a combination of both prior to ingestion by the organism to activate the battery 100. A time scale for water diffusion through the polymer 108 may be governed by engineering extrinsic factors, such as polymer thickness, and intrinsic compositions, such as polymer hydrophobicity, porosity, and tortuosity. Controlling the time scale for water diffusion through the polymer 108 may be important for controlling a delay time after oral ingestion before battery activation. Slower water diffusion can be used to achieve increased delay times so that the battery 100 becomes activated at a point that is farther downstream in the GI tract 300, whereas accelerated water diffusion can be used to activate the battery 100 more rapidly.

The electrolyte 220 permeates the polymer 108 and leads to activation of the anode 110 and the cathode 112 of the battery 100 to commence battery operation. At stage (c), the battery 100 delivers a current 224 across a hypothetical resistive load between the leads 104 and 106. Current is delivered across electrode leads 104 and 106 by migrating cations 116 infused in the anode 110 from the anode 110 to the cathode 112. The current 224 delivered by the battery 100 may be, for example, approximately 0.1 milliamps (mA) at voltages less than or equal to 1 volt (V). The operation lifetime of the battery 100 may be, for example, approximately 1 hour for a total charge capacity of approximately 0.1 mA-h.

After all energy has been dissipated from the battery 100, the battery 100, including the cathodic lead 104, the anodic lead 106, the water-permeable biocompatible polymer 108, the anode 110, the cathode 112, and the separator 114, may degrade, or break down, and may lose mechanical integrity at stage (d) as it progresses toward the end of the large intestine 306 of the GI tract 300. The bulk of the battery mass (e.g., greater than 90% of the battery mass) may be present within the organism for a finite amount of time. The total amount of time that the battery 100 resides in the GI tract 300 may be, for example, 24 to 36 hours, but no longer than 5 to 7 days. For example, 90% of the initial mass of the battery 100 may exist within the organism for a time period of less than 5 days, assuming normal digestive function of the organism. After this time period, the materials of the battery 100 are absorbed or metabolized, or passed through the GI tract 300 and eventually excreted. The materials of the battery 100 are selected such that they can be completely bioabsorbed by the organism or efficiently secreted without any negative health impacts.

Figure 4:
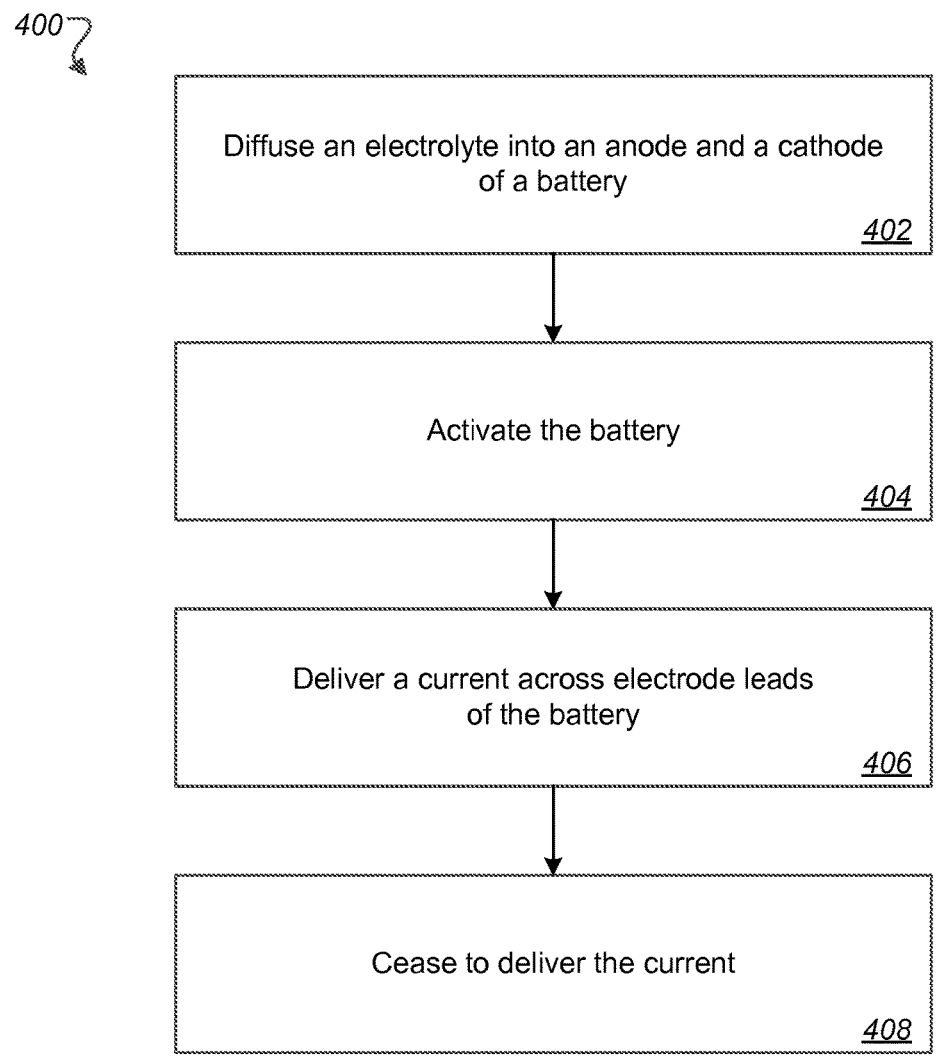
FIG. 4 is a flowchart of operations performed by a water-activated, ingestible battery.

FIG. 4 is a flowchart of operations performed by a water-activated, ingestible battery. As described above, the process 400 includes diffusing an electrolyte into an anode and a cathode of the battery following a dissolution of an outer casing of the battery (402). In some implementations, diffusing the electrolyte into the anode and the cathode may include dissolving the electrolyte contained in reservoirs within a cell casing of the battery. In some implementations, diffusing the electrolyte into the anode and the cathode may include passing the electrolyte through the cell casing.

Based on the diffusion of the electrolyte, the battery is activated (404). Following activation, current is delivered a current across electrode leads of the battery (406). Current is delivered across electrode leads by migrating cations infused in the anode from the anode to the cathode of the battery. The delivering of the current across the electrode leads may cause a powering of a medical device that is implanted in the organism that ingests the battery. After a predetermined time, the battery ceases to deliver the current across the electrode leads (408). Following a cease in the delivery of the current, the battery is configured to degrade or break down.

A number of implementations have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the describe apparatus and systems. Accordingly, other embodiments are within the scope of the following claims.

What is claimed is:

1. A water-activated, ingestible battery, comprising:
   a cathode comprising a metal oxide with a decreased amount of toxicity, relative to an amount of toxicity of other metal oxides;
   an anode comprising a biocompatible, water stable compound and an intercalated compound, the anode infused with benign cations;
   a separator between the cathode and the anode;
   a cathodic lead comprising a first conducting material, the cathodic lead in contact with the cathode;
   an anodic lead comprising a second conducting material, the anodic lead in contact with the anode; and
   a cell casing comprising a water-permeable biocompatible polymer and further comprising a plurality of reservoirs including a solid electrolyte, the cathodic lead, and the anodic lead, with the cell casing enclosing the cathode, the anode, and the separator;
   wherein a time scale of activation of the water-activated, ingestible battery is based on a configuration of the plurality of reservoirs of the cell casing.

2. The water-activated, ingestible battery of claim 1, wherein the cathode comprises a manganese oxide (MnO2).

3. The water-activated, ingestible battery of claim 1, wherein the anode comprises one or more of a porous activated carbon electrode and the intercalated compound, wherein the intercalated compound comprises sodium titanium phosphate.

4. The water-activated, ingestible battery of claim 1, wherein the benign cations comprise at least one of sodium or potassium.

5. The water-activated, ingestible battery of claim 1, wherein the separator comprises a fibrous cellulosic material.

6. The water-activated, ingestible battery of claim 1, wherein one or more of the first conducting material and the second conducting material comprise at least one of a gold material, a graphite material, a carbon material, or a conducting polymer.

7. The water-activated, ingestible battery of claim 1, wherein the water-permeable biocompatible polymer comprises at least one of a polyester, an alpha-hydroxy polyester, a poly(L-lactide), a poly(glycolide), a poly(L-lactide) copolymer, a poly(glycolide) copolymer, a poly(ε-caprolactone) (PCL), a polycarbonate, a polyorthoester, a polyanhydride, a polyphosphoester, or a polyamide.

8. The water-activated, ingestible battery of claim 1, wherein the electrolyte permeates through the cell casing and diffuses into the cathode and into the anode to activate the water-activated, ingestible battery.

9. The water-activated, ingestible battery of claim 1, wherein the electrolyte dissolves and diffuses from one or more of the reservoirs into the cathode and the anode, when hydrated in a natural aqueous environment to activate the water-activated, ingestible battery.

10. The water-activated, ingestible battery of claim 9, wherein the electrolyte comprises sodium sulfate.

11. The water-activated, ingestible battery of claim 1, wherein the cathode, the anode, the separator, the cathodic lead, and the anodic lead are arranged in a planar configuration.

12. The water-activated, ingestible battery of claim 1, further comprising:
   an outer casing comprising gelatin in a capsule form, the outer casing enclosing the cathode, the anode, the separator, the cathodic lead, the anodic lead, and the cell casing.

13. The water-activated, ingestible battery of claim 1, wherein the metal oxide comprises a non-toxic metal oxide.

14. A method performed by an orally ingestible battery upon exposure of the orally ingestible battery to an aqueous environment, the orally ingestible battery including an outer gelatin casing, a cathode, an anode, an electrode lead for each of the cathode and anode, and a cell casing enclosing at least the cathode and anode and comprising a water-permeable biocompatible polymer including a plurality of reservoirs each including a solid electrolyte, the method comprising:
- dissolution of the outer gel casing upon exposure to an aqueous environment,
- following the dissolution of the outer gelatin casing of the orally ingestible battery,
- diffusing, at a diffusion rate that causes the orally ingestible battery to activate at a predetermined location in an organism, the electrolyte into the anode and the cathode of the orally ingestible battery, the diffusion rate being based on a tortuosity of a water-permeable biocompatible polymer and a geometry of the water-permeable biocompatible polymer of the orally ingestible battery, and wherein the diffusion rate is further based on a configuration of the plurality of reservoirs of the cell casing;
- activating, based on diffusion of the electrolyte, the orally ingestible battery;
- following activation, delivering a current across the electrode leads of the orally ingestible battery; and
- ceasing to deliver the current across the electrode leads after a predetermined time;
- wherein the orally ingestible battery is configured to breakdown following a cease in delivery of the current; and
- wherein the cathode comprises a metal oxide with a decreased amount of toxicity, relative to an amount of toxicity of other metal oxides to promote safe oral ingestion of the orally ingestible battery by the organism.

15. The method of claim 14, further comprising:
- causing, based on activation of the orally ingestible battery, a powering of a medical device that is implanted in the organism that ingests the orally ingestible battery.

16. The method of claim 14, wherein the water-permeable biocompatible polymer comprises at least one of a polyester, an alpha-hydroxy polyester, a poly(L-lactide), a poly(glycolide), a poly(L-lactide) copolymer, a poly(glycolide) copolymer, a poly(ε-caprolactone) (PCL), a polycarbonate, a polyorthoester, a polyanhydride, a polyphosphoester, or a polyamide.

17. The method of claim 14, wherein the anode comprises one or more of a porous activated carbon electrode or an intercalated sodium titanium phosphate material.

18. The method of claim 14, wherein the cathode comprises a manganese oxide ($MnO_2$).

19. The method of claim 14, wherein the electrode leads each comprise at least one of a gold material, a graphite material, a carbon material, or a conducting polymer.

20. The method of claim 14, further comprising:
- dissolving the electrolyte included in each of the plurality of reservoirs within the cell casing before activating the orally ingestible battery.

21. The method of claim 14, further comprising:
- passing the electrolyte through the cell casing before activating the orally ingestible battery.

22. The method of claim 14, wherein the electrolyte comprises sodium sulfate.

23. The method of claim 14, wherein delivering the current across the electrode leads comprises:
- migrating sodium cations infused in the anode from the anode to the cathode.

24. A water-activated, ingestible battery, comprising:
- a cathode comprising a lambda manganese oxide;
- an anode comprising a porous activated carbon electrode and an intercalated sodium-titanium phosphate compound, the anode infused with sodium cations;
- a separator between the anode and the cathode, the separator comprising a fibrous cellulosic material;
- a cathodic lead comprising a gold material, the cathodic lead in contact with the cathode;
- an anodic lead comprising a gold material, the anodic lead in contact with the anode;
- a cell casing comprising an alpha-hydroxy polyester, the cathodic lead, the anodic lead, and the cell casing enclosing the cathode, the anode, and the separator;
- an electrolyte comprising sodium sulfate, the electrolyte to permeate through the cell casing and diffuse into the cathode and the anode to activate the water-activated, ingestible battery; and
- an outer casing comprising gelatin in a capsule form, the outer casing enclosing the cathode, the anode, the separator, the cathodic lead, the anodic lead, and the cell casing.

* * * * *